US 6,635,294 B2

(12) United States Patent
Keijbets

(10) Patent No.: US 6,635,294 B2
(45) Date of Patent: Oct. 21, 2003

(54) METHOD FOR PROVIDING A COATING ON PRE-FRIED DEEP-FRY PRODUCTS

(76) Inventor: Martin Jozef Hubert Keijbets, Hamelakkerlaan 31, 6703 EH Wageningen (NL)

( * ) Notice: Subject to any disclaimer, the term of this patent is extended or adjusted under 35 U.S.C. 154(b) by 356 days.

(21) Appl. No.: 09/822,956

(22) Filed: Mar. 30, 2001

(65) Prior Publication Data

US 2002/0031579 A1 Mar. 14, 2002

(51) Int. Cl.$^7$ ................................................ A23L 1/217
(52) U.S. Cl. ........................ 426/303; 426/438; 426/441; 426/637
(58) Field of Search ................................ 426/102, 302, 426/303, 438, 441, 637

(56) References Cited

U.S. PATENT DOCUMENTS

| 3,656,969 A | | 4/1972 | Horn | |
|---|---|---|---|---|
| 4,511,583 A | | 4/1985 | Olson et al. | |
| 5,059,435 A | * | 10/1991 | Sloan et al. | 426/102 |
| 5,302,410 A | | 4/1994 | Calder et al. | |
| 5,393,552 A | | 2/1995 | Busacker et al. | |
| 5,431,944 A | * | 7/1995 | Melvej | 426/552 |
| 5,622,741 A | | 4/1997 | Stubbs et al. | |
| 5,897,898 A | * | 4/1999 | Rogols et al. | 426/102 |
| 6,033,697 A | * | 3/2000 | Judkins et al. | 426/102 |
| 6,086,928 A | * | 7/2000 | Stevens et al. | 426/92 |
| 6,132,785 A | * | 10/2000 | Collinge et al. | 426/302 |
| 6,159,521 A | * | 12/2000 | Horn et al. | 426/549 |
| 2001/0004463 A1 | * | 6/2001 | Rogols et al. | 426/94 |
| 2002/0001643 A1 | * | 1/2002 | Stevens et al. | 426/96 |
| 2002/0150656 A1 | * | 10/2002 | Farnsworth et al. | 426/94 |
| 2003/0044488 A1 | * | 3/2003 | Roskam et al. | 426/102 |

FOREIGN PATENT DOCUMENTS

| EP | 0 499 684 A1 | 8/1992 |
|---|---|---|
| EP | 0 898 902 A2 | 3/1999 |
| EP | 0 913 099 A1 | 5/1999 |
| WO | WO 97/42827 | 11/1997 |
| WO | WO 99/34691 | 7/1999 |

* cited by examiner

Primary Examiner—Nina Bhat
(74) Attorney, Agent, or Firm—Beck & Tysver, P.L.L.C.

(57) ABSTRACT

A method for applying a coating to deep-fry products, such as fried potato chips, wherein the deep-fry products are died and wherein a layer of aqueous flour batter is applied to the deep-fry products. The coating is applied to the deep-fry products before the deep-fry products are dried. The coating is then applied to the deep-fry products while the deep-fry products are contacted with a dipping solution. In the dipping solution, the flour batter is added in a suspension.

16 Claims, 1 Drawing Sheet

METHOD FOR PROVIDING A COATING ON PRE-FRIED DEEP-FRY PRODUCTS

BACKGROUND

The disclosure relates to a method for providing a coating on deep-fry products, such as fried potato chips, where the deep-fry products are dipped and where a layer of aqueous flour batter is applied to the deep-fry products.

Such a method is known from U.S. Pat. No. 5,622,741 and is generally applied in the industry these days. Non-coated deep-fry products relatively rapidly lose the crispness which makes them so popular, and instead become soft, tough and sticky. This is due to migration of moisture from the inside of the deep-fry product into the dry, crispy crust. Coated deep-fry products have a clearly better crispness after frying, which can be maintained longer.

What is meant by deep-fry products, are potato products, such as fried potato chips, or the like, such as potato slices. Other deep-fry products can be provided with a coating, such as deep-fry snacks and the like. In particular, the disclosure relates to pre-fried deep-fry products. In an industrial process, such products are pre-fried in a frying oven in hot fat or oil, and can be finish-fried, for example, at home or in a catering establishment to a consumable product. This finish-frying can be done by deep-frying, but, in some cases, it is also possible to finish-fry the products in a hot air oven or even in a microwave oven, depending on the nature and composition of the product and the coating. Preparation of potato products will be described further. However, the invention also relates to the preparation of deep-fry products not related to potatoes.

The preparation of fried potato chips is substantially as follows: potatoes are peeled and divided into segments such as slices, sticks, or the like. After sorting, during which segments with a deviant color or shape are removed, the segments are blanched. Subsequently, coloring agents such as reducing sugars, agents for preventing greying (such as sodium pyrophosphate) and flavoring substances (salt) are added. After this "dip-step", the segments are dried, before the aqueous flour batter is applied to the deep-fry products. This application can be done in several manners. The batter can be sprayed in an aqueous form onto the segments, or the batter is contained in a bath, through which the segments can be passed. The batter is an aqueous flour batter, of for instance rice flour or wheat flour, and usually further contains starch, dextrin, laved agents and salt. The batter forms a very crispy crust around the potato. Because of this coating, the chips cool less rapidly. The holding time after finish-frying (during which the chips are often kept warm under a heat lamp) can thereby be considerably improved, so that chips, instead of about 3–5 minutes, can stay crispy for as long as 10–20 minutes.

For compositions of batter, reference is made to patent specifications EP-A-0,499,684, WO-A-097,42827 and EP-A-0,899,902. The processes described there all include a step where the segments are dried before the batter is applied. This step is considered necessary for a good adhesion of the batter to the segment. The drying of the blanched segments generally takes place by transporting them via a belt dryer to a batter bath, i.e. a place where the batter is applied.

A drawback of the current processing of batter is that, because of its adhesive action, it not only sticks to the surface of the potato segment, but also makes the segments cake together. In process, problems are experienced with caked-together segments, such as during the pre-frying, are fried together into one mass, such a mass leads to loss in production and quality.

Solutions to this problem have been sought in different directions. For instance, agents are added to the batter for reducing the effect of agglomeration. Many of the publications mentioned appear to claim that the newly developed batter does not have this effect of caking together, or, at least, to a reduced extent. In practice, however, it appears that it is still necessary to take additional measures to prevent caking together of the segments. Such measures include, in particular, installing a conveyor belt on which the segments are brought in a single layer (such as a singling belt), where, by means of air, excess batter is blown off the segments (also called an air knife). The batter that is blown off can be re-used by applying a recovering system. Additionally, the chips can be initially fried for 10–15 seconds in a first deep-fry oven to harden the batter, and then placed on a vibrator to separate the chips. The chips are then fried again in a second deep-fry oven.

Such measures are disadvantageous to the efficiency of the process. Moreover, installing such a vibrator and second frying oven in an existing production line involves very high costs. Additionally, this extra step entails a loss of capacity. Investments, loss of capacity, additional work and the cost of the batter itself thus lead to a considerable increase of the cost of the product to consumers.

SUMMARY

The process of the present disclosure avoids the above-mentioned drawbacks and provides a method where a layer of batter can be applied to the segments. This method is considerably less expensive, more efficient, and without the problems of agglomeration as the methods described above.

This object is achieved with a method of the type mentioned above, wherein the deep-fry products, before dry, are contacted with a dipping solution, to which a flour batter has been added in a suspension. When applying the method, it appears that, despite the fact that the batter can adhere to a much lesser extent to the potato segment, this adhesion is sufficient to form a coating which is advantageous to the taste and the crispness of the deep-fry product, and whose holding is still considerably better than when no coating has been applied. In an experiment, 100% of the deep-fried chips passed a "break test". In fast food restaurants, the break test is a standard for the crispness. After a certain amount of time, sticks of chips should still break for a large part, for instance after having been kept under a heat lamp for 10 minutes. Surprisingly, the adhesive action between the individual segments is largely lost. By applying the present method expensive additional measures such as the extra batter bath, the air knife, the singling belt, the vibrator and the second deep-fry oven, are not necessary. It is sufficient to add the batter in an exiting production press, in the step before the drying.

Incidentally, it is noted, that from the U.S. Pat. Nos. 5,302,410 and 5,393,552 it is known per se, in the dipping step, to add additives which comprise a hydrolysis starch such as a (malto)dextrin. However, this method cannot be compared to what is meant here, which is, adding a batter. Although this batter also contains dextrin, it comprises in particular flour products, so that the batter forms a separate, crispy layer on the surface of the potato. In the above-mentioned US-publications dexter is rather used to achieve, in combination with a specific acidity a sloughing effect, so that the structure of the potato surface itself is changed without a separate crispy layer being formed therearound. Such a specific acidity is of no importance with a batter.

Applying a coating to the deep-fry products is, according to the method, carried out during the dipping step mentioned earlier. In the industry, this dipping step can for instance take place in a screw balancer, a dipping bath or a so-called flume. The latter is a tube, through which the blanched segments are transported with water. The segments are contacted with a dipping solution, which solution can comprise colorants, agents for preventing greying, and flavorings. In the dipping solution, the batter is added as suspension.

A batter can be successfully applied in a conventional production on, in which, normally, deep-fry products are not provided with a layer of batter. By simply adding the batter to the customary dipping solution, a suspension is formed, from which the deep-fry products still absorb a layer of batter (albeit a relatively small one). Then, the deep-fry products are dried in the customary steps and supplied to a deep-fry oven, after which they are prepared for shipment by cooling and freezing them.

BRIEF DESCRIPTION OF THE DRAWINGS

With reference to FIG. 1, an example will be described, in which a coating is applied to a fried potato chip. Steps 10, 15, 20 and 25 are known in the art as described, for instance, in U.S. Pat. No. 5,622,741 mentioned above. Accordingly, these steps are described only briefly.

Figure 1:
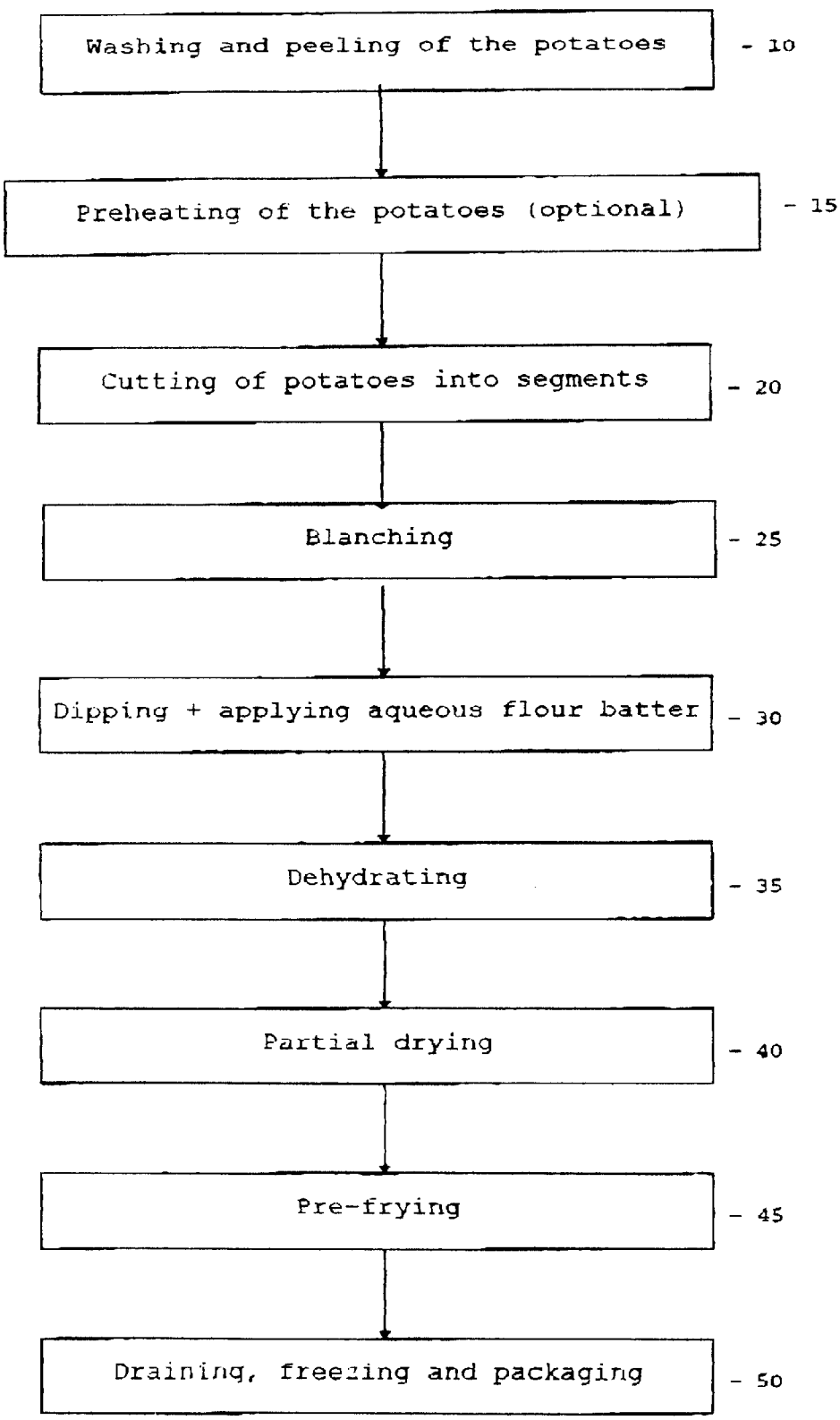
FIG. 1 is a flowchart of a method of the present disclosure.

First, the potatoes are washed and peeled (10). The peeling can, if so desired, be omitted. To facilitate the cutting (20), the potatoes can be pre-heated. The cutting is most often done with a water knife, i.e. a tubular body, through which the potatoes are fed in a flow of water, through a knife shaped element, disposed in the tubular body. The water knife forms a multiplicity of potato segments. The segments are blanched (25), i.e. slightly boiled in steam or hot water.

After blanching, the segments are transported, in step 30, by a transporting tube (or flume) to a dehydrating apparatus. The transport medium by which the segments are transported, is an aqueous solution, or a dipping solution. The dipping solution mostly contains a reuse sugar. Such a substance can give the potato segment a desired degree of browning. Additionally, the dipping solution often contains agents which keep metal ions in solution, so that greying of the potato is avoided. An example of an agent having such an effect is acid sodium pyrophosphate (a chelating agent). Further, the solution can contain flavorings, in particular salt (sodium chloride).

Flour batter in a suspension has been added to the dipping solution. Compositions of the flour batter are for instance known from patent specifications EP 0,499,684, PCT 97,42827 and EP 0 898,902 and nowadays are generally applied in the industry. Apart from flour, the batter usually comprises dextrin, starch, leavening agents and salt, and can contain further additions, such as for instance thickening agents, celluloses and proteins. Various sorts of starch can be used. For instance, apart from potato starch, maize starch and tapioca starch can be applied. A possible ratio of dry matter to water is 10:90 percent by weight, but the solution can, if so desired, also be more or less aqueous.

The segments provided with a coating in this manner leave the flume and, during a short period of time, drain on a dehydration apparatus to lose the greater part of water (35). Subsequently, the sticks are led through a belt dryer, where, during the residence time, the segments with the coating can partially dry (40). The thus dried segments are subsequently pre-fried (45) in a deep-fry oven, for a short period of time, after which the pre-fried sticks are drained, frozen and packaged (50).

With the method described hereinabove, it is clear that no use needs to be made of a separate batter bath, the above-mentioned air knife, a singling belt, a vibrator and a second deep-fry oven.

The disclosure is not limited to applying a coating only meant to increase crispness and holding time. Such coatings are also called clear-coatings because they are as little visible as possible. The method can also be applied with batter to which spices, colorants, fragrances and flavorings have been added, with the aim to produce spicy prefried deep-fry products. These coatings, also known as "spicy coatings" or "savory coatings" are clearly visible, due in part to the color of the spices and/or by added (natural) colorants.

What is claimed is:

1. A method of providing a coating on pre-fried deep-fry products, the method comprising:
    applying a dipping solution to the products, wherein the dipping solution includes a flour batter added in suspension;
    at least partially drying the products subsequent to applying the dipping solution; and
    pre-frying the products subsequent to at least partially drying the products.

2. The method of claim 1 wherein at least partially drying the products includes dehydrating the products subsequent to applying a dipping solution to the products and applying a dryer to the products subsequent to dehydrating the products.

3. The method of claim 2 wherein the dipping solution includes a dry matter to water ratio of approximately 10:90 percent by weight.

4. The method of claim 1 wherein the products are potato products.

5. The method of claim 1 wherein the dipping solution further includes dextrin, starch, leavening agents and salt.

6. The method of claim 1 further comprising blanching the products prior to applying the dipping solution.

7. The method of claim 6 wherein applying the dipping solution is performed while the products are transferred from blanching the products to at least partially drying the products.

8. The method of claim 7 wherein the products are transported in a flume.

9. The method of claim 1 wherein at least partially drying the products is performed immediately after applying the dipping solution to the products.

10. A method of providing a coating on pre-fried deep-fry potato products, the method comprising:
    washing potatoes;
    cutting the potatoes into segments;
    blanching the segments;
    applying a dipping solution to the segments, wherein the dipping solution includes a flour batter added in suspension;
    at least partially drying the segments subsequent to applying the dipping solution; and
    pre-frying the segments subsequent to at least partially drying the products.

11. The method of claim 10, and further comprising peeling the potatoes.

12. The method of claim 10, further comprising preheating the potatoes prior to cutting the potatoes into segments.

13. The method of claim 11, and further comprising at least partially dehydrating the segments subsequent to applying the dipping solution and prior to at least partially drying the segments.

14. The method of claim 10, and further comprising packaging the segments.

15. The method of claim 10 wherein cutting the potatoes includes cutting the potatoes with a water knife.

16. The method of claim 10 wherein blanching includes slightly boiling the segments in one of steam and hot water.

* * * * *